United States Patent
Zhang et al.

(10) Patent No.: US 11,031,218 B2
(45) Date of Patent: Jun. 8, 2021

(54) DATA ACQUISITION METHOD IN A MASS SPECTROMETER

(71) Applicant: SHIMADZU CORPORATION, Kyoto (JP)

(72) Inventors: Xiaoqiang Zhang, Shanghai (CN); Yunqing Huang, Shanghai (CN); Wenjian Sun, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/645,863

(22) PCT Filed: Oct. 29, 2018

(86) PCT No.: PCT/JP2018/040129
§ 371 (c)(1),
(2) Date: Mar. 10, 2020

(87) PCT Pub. No.: WO2019/102798
PCT Pub. Date: May 31, 2019

(65) Prior Publication Data
US 2020/0266041 A1    Aug. 20, 2020

(30) Foreign Application Priority Data

Nov. 23, 2017    (CN) .......................... 201711183676.9

(51) Int. Cl.
*H01J 49/00*    (2006.01)
*G01N 30/72*    (2006.01)
(Continued)

(52) U.S. Cl.
CPC ...... *H01J 49/0036* (2013.01); *G01N 30/7233* (2013.01); *H01J 49/0045* (2013.01);
(Continued)

(58) Field of Classification Search
CPC .... H01J 49/0036; H01J 49/0045; H01J 49/40; H01J 49/0027; H01J 49/062; H01J 49/427; H01J 49/429; G01N 30/7233
(Continued)

(56) References Cited

U.S. PATENT DOCUMENTS 5,672,870 A    9/1997    Flory et al.
6,166,374 A    12/2000    Snyder
(Continued)

FOREIGN PATENT DOCUMENTS

| CN | 104952686 A | 9/2015 |
|----|-------------|--------|
| JP | 2012500967 A | 1/2012 |

(Continued)

OTHER PUBLICATIONS

JPO, "Japanese Office Action for Application No. JP 2019-570171", Japan, dated Oct. 13, 2020.
(Continued)

*Primary Examiner* — Kiet T Nguyen
(74) *Attorney, Agent, or Firm* — Tim Tingkang Xia, Esq.; Locke Lord LLP

(57) ABSTRACT

A data acquisition method in a mass spectrometer includes a. providing an ion source to generate precursor ions; b. feeding the precursor ions into a first mass analyzer that selects one mass window such that the precursor ions located outside the mass window pass through the first mass analyzer and the precursor ions located within the mass window cannot pass through the first mass analyzer; c. feeding the precursor ions passing through the first mass analyzer into a collision cell for collisional dissociation, to generate product ions; d. feeding the product ions into a second mass analyzer for mass analysis and recording a spectrum; and e. repeating Steps b-d. Each time when Step b is repeatedly performed, the selected mass window does
(Continued)

not overlap with all the mass windows previously selected. After all the mass windows in a mass range are selected, the repetition is stopped.

20 Claims, 6 Drawing Sheets

(51) Int. Cl.
 *H01J 49/40* (2006.01)
 *H01J 49/06* (2006.01)
 *H01J 49/42* (2006.01)

(52) U.S. Cl.
 CPC ............ *H01J 49/062* (2013.01); *H01J 49/40* (2013.01); *H01J 49/427* (2013.01); *H01J 49/429* (2013.01)

(58) Field of Classification Search
 USPC ................................................ 250/282, 290
 See application file for complete search history.

(56) References Cited

U.S. PATENT DOCUMENTS

| | | | |
|---|---|---|---|
| 6,717,130 | B2 | 4/2004 | Bateman et al. |
| 6,870,157 | B1 | 3/2005 | Zare |
| 8,426,155 | B2 * | 4/2013 | Hartmer ................ H01J 49/145 435/23 |
| 8,809,770 | B2 | 8/2014 | Bonner et al. |
| 2009/0302210 | A1 | 12/2009 | Castro-Perez et al. |
| 2010/0084547 | A1 | 4/2010 | Pringle et al. |
| 2011/0291001 | A1 | 12/2011 | Hoyes et al. |
| 2015/0279640 | A1 | 10/2015 | Flory |
| 2016/0329197 | A1 | 11/2016 | Yamaguchi |
| 2016/0343557 | A1 | 11/2016 | Yamaguchi |
| 2017/0098531 | A1 | 4/2017 | Green et al. |
| 2019/0214238 | A1 * | 7/2019 | Richardson ......... H01J 49/0072 |
| 2020/0312644 | A1 * | 10/2020 | Bonner .............. G01N 30/7233 |

FOREIGN PATENT DOCUMENTS

| | | |
|---|---|---|
| JP | 2016170174 A | 9/2016 |
| WO | 03103010 A1 | 12/2003 |
| WO | 2015107642 A1 | 7/2015 |
| WO | 2015107690 A | 7/2015 |
| WO | 2017053932 A | 3/2017 |

OTHER PUBLICATIONS

SIPO, "First Chinese Office Action for Application No. 201711183676. 9", China, dated Sep. 2, 2020.

Ducret, Axel et al., "High throughput protein characterization by automated reverse-phase chromatography/electrospray tandem mass spectrometry", Protein Science, 1998, pp. 706-719, vol. 7.

EPO (ISR/EP), "International Search Report and Written Opinion for PCT Application No. PCT/JP2018/040129", NL, dated Jan. 25, 2019.

* cited by examiner

[Fig. 1]
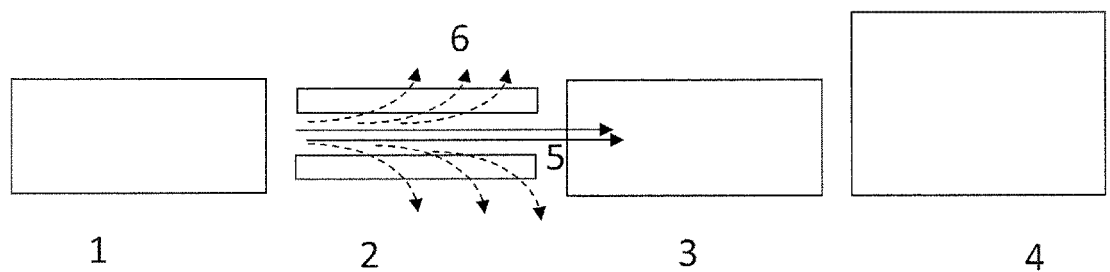
[Fig. 2]
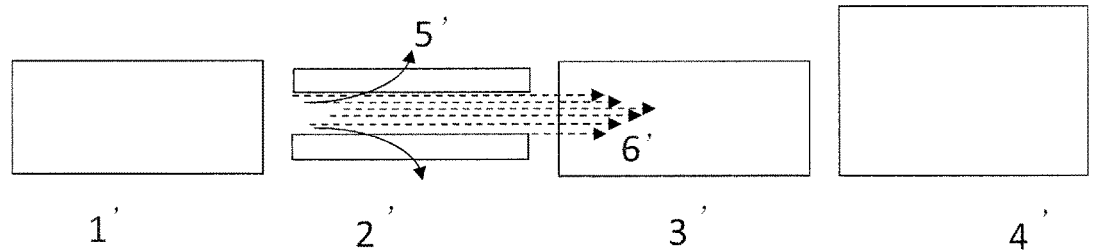

[Fig. 3]
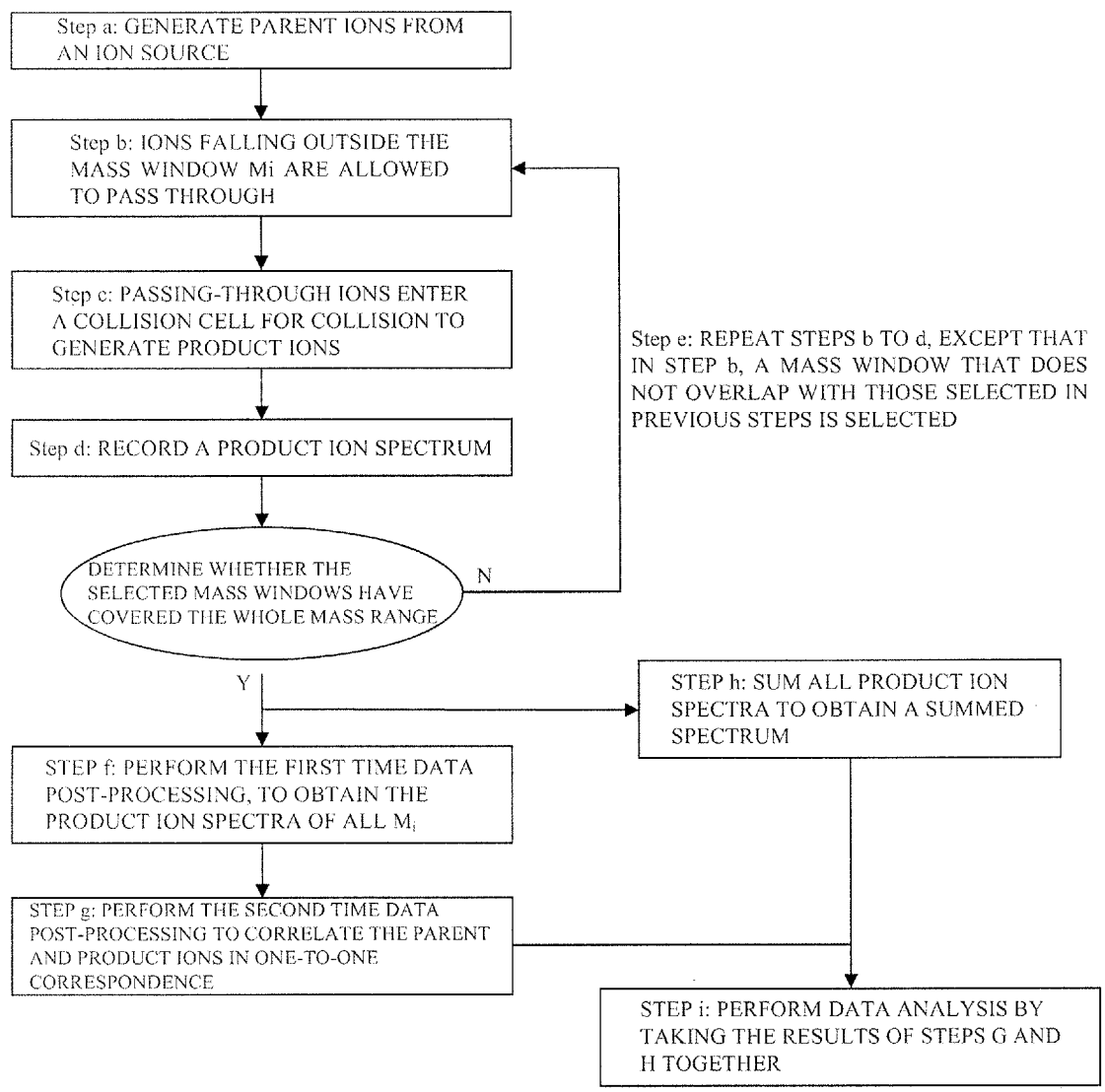

[Fig. 4]
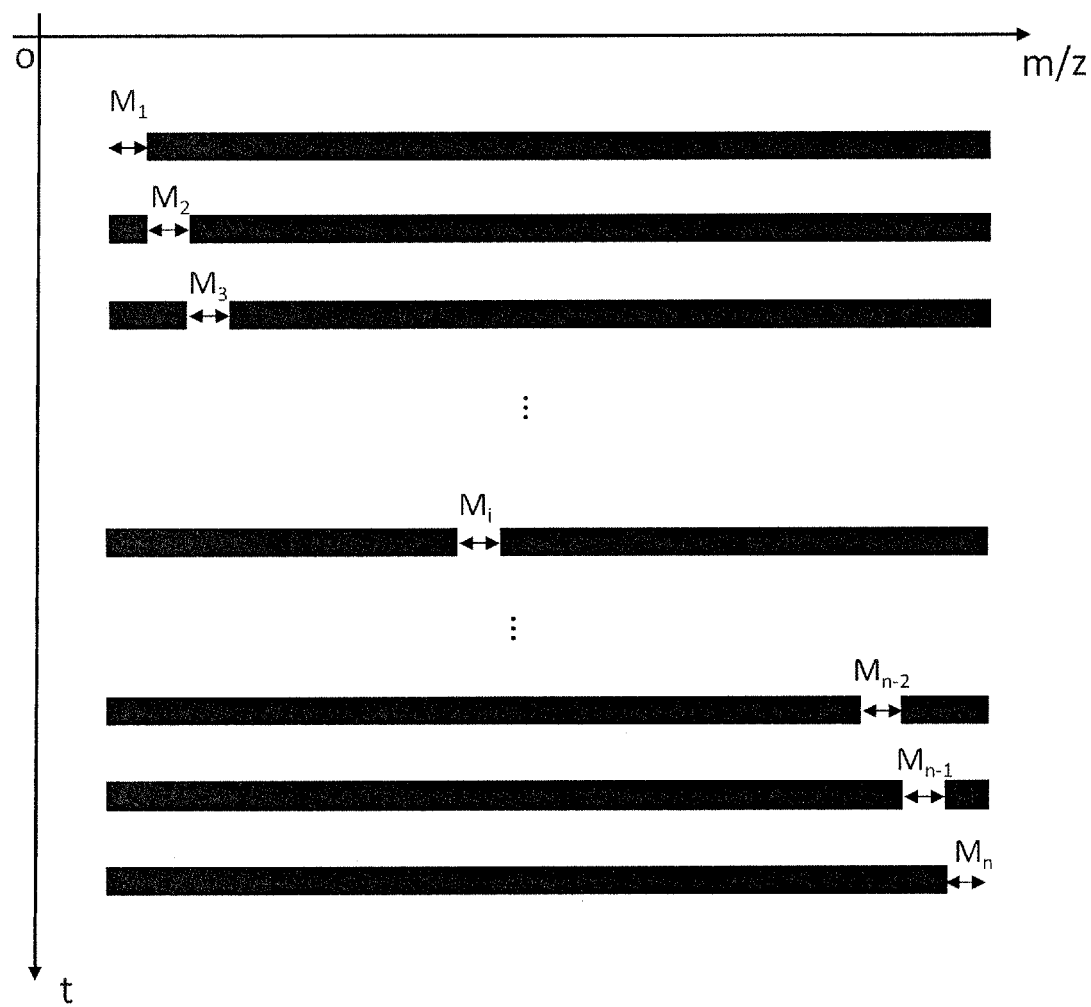

[Fig. 5]
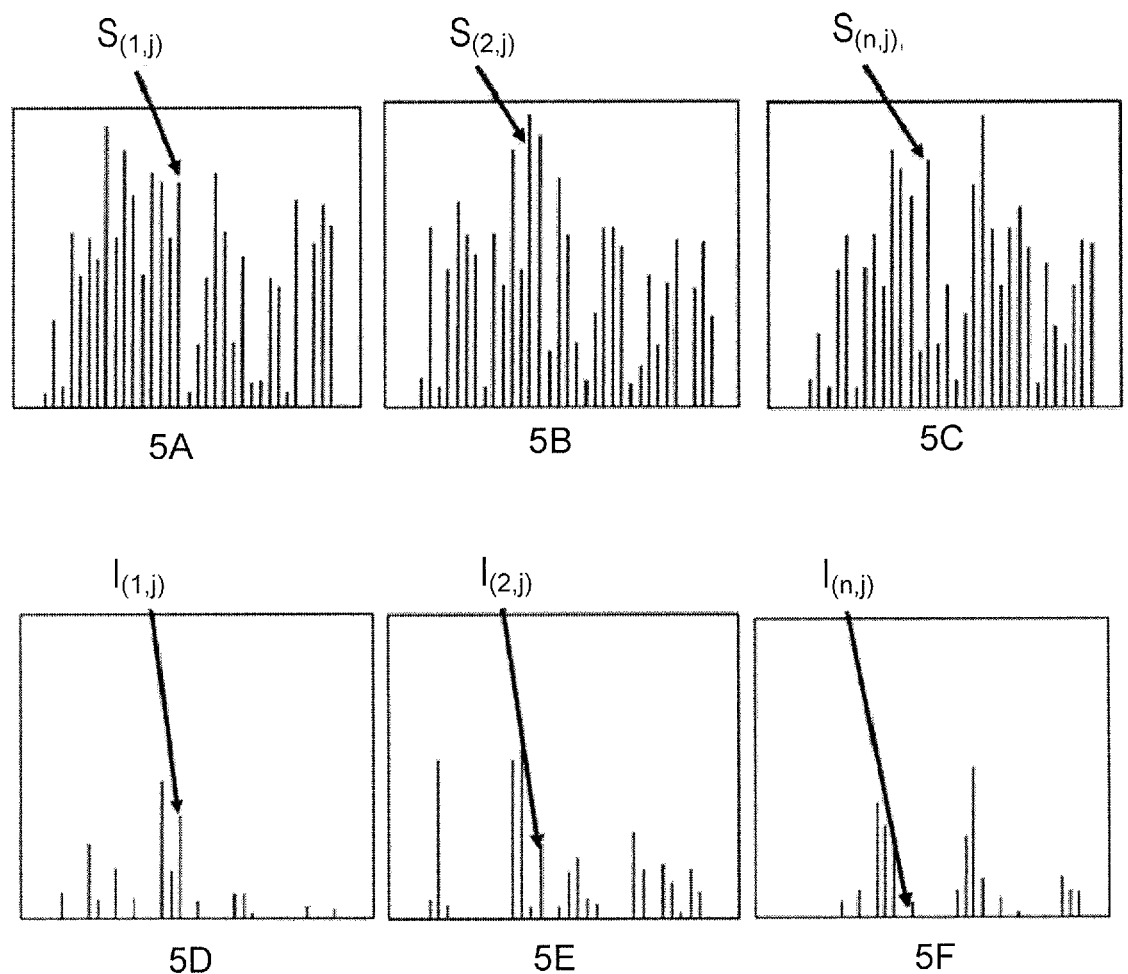

[Fig. 6]
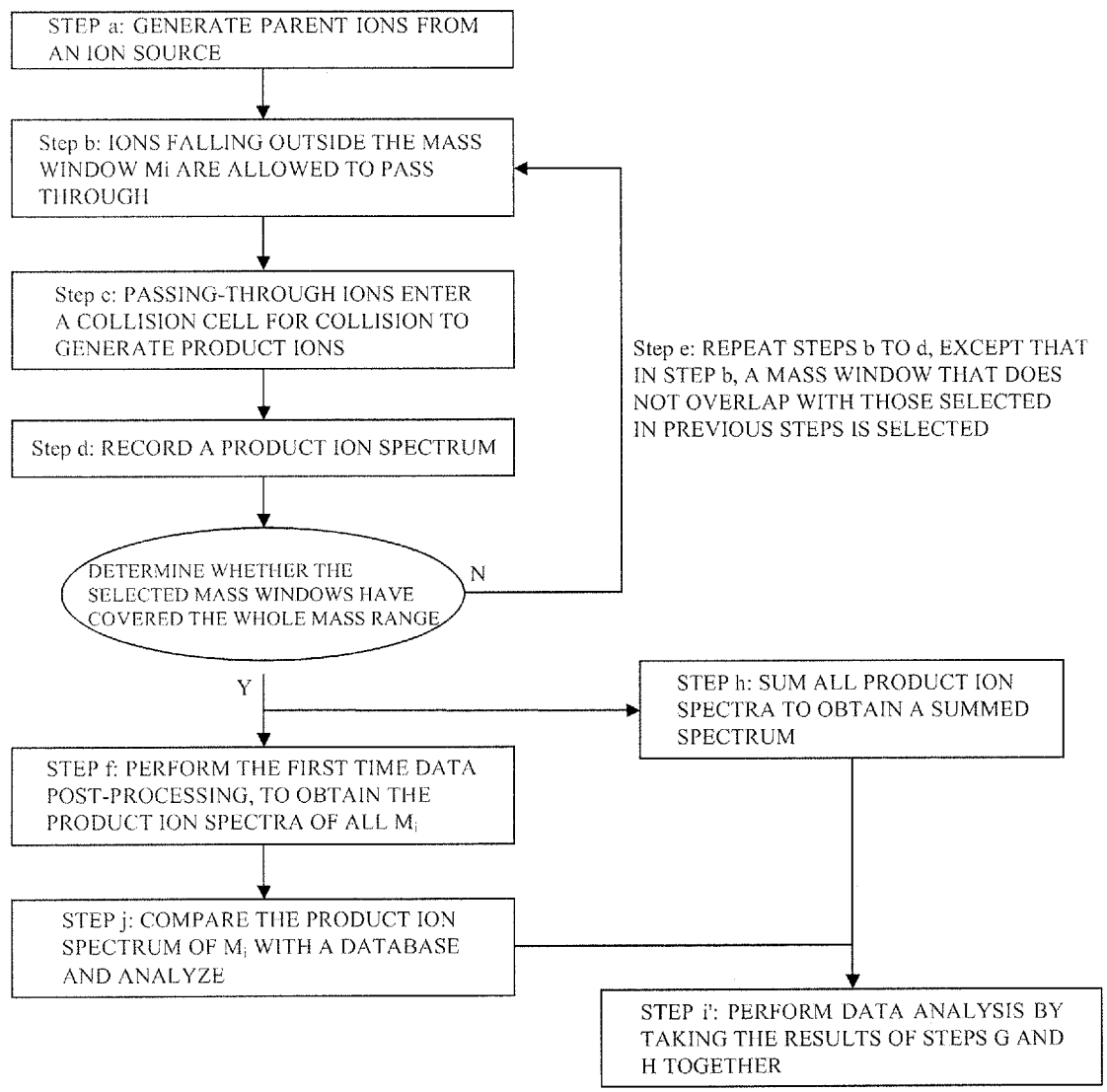

[Fig. 7]
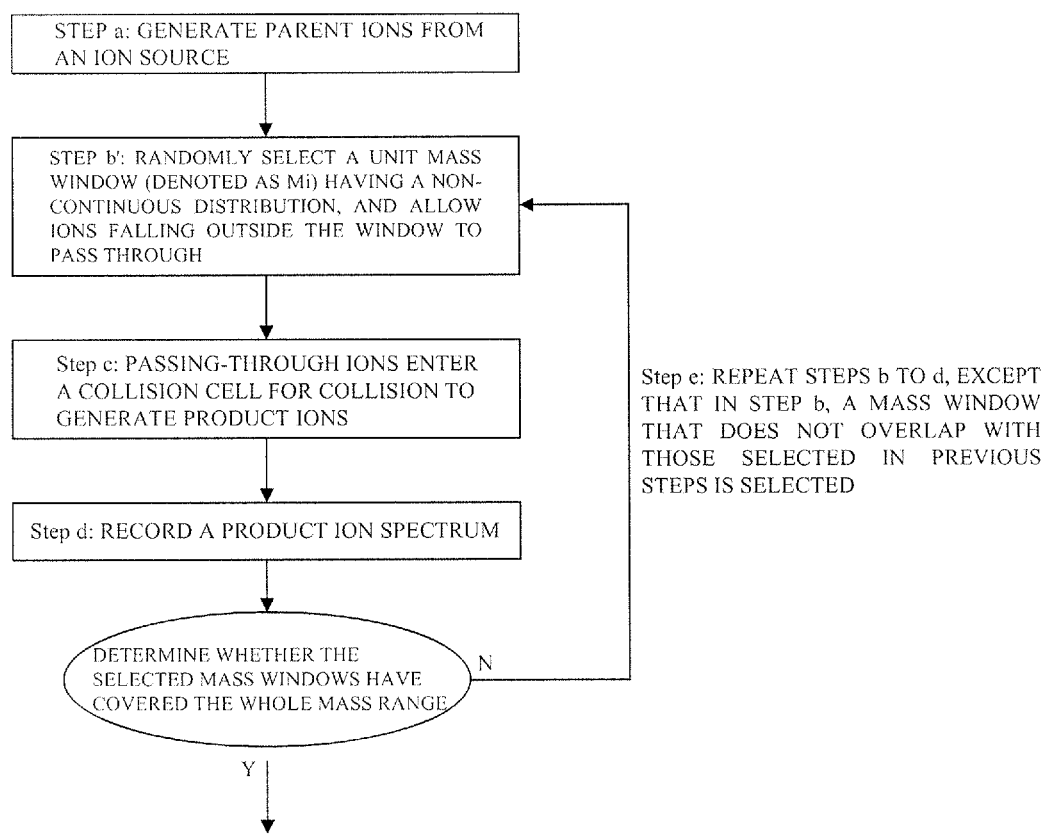

DATA ACQUISITION METHOD IN A MASS SPECTROMETER

TECHNICAL FIELD

The present invention relates to the field of mass spectrometry (MS) data acquisition, and particularly to a novel data acquisition method in a mass spectrometer.

BACKGROUND ART

High resolution tandem mass spectrometer has now become an important analytical instrument in omics analysis (including metabolomics, and proteomics, etc.). For complex samples in omics analysis, high-throughput, high-sensitivity, and high-coverage mass spectrometry data acquisition methods are required. The traditional methods comprise data dependent acquisition (DDA) proposed by Ducret et al. in 1998. In this method, precursor ion scan is performed first, and then precursor ions with high abundance are selected, and allowed to enter a collision cell for dissociation, to obtain a product ion spectrum. This method can achieve a high analyte coverage, and thus is still a widely used acquisition method.

In recent years, data independent acquisition (DIA) has been developed rapidly. Compared with the DDA method, this method has higher sensitivity, dynamic range, and analytical throughput and better quantification capability. A typical representative of such a method is the $MS^E$ method described in U.S. Pat. No. 6,717,130 and the SWATH method described in U.S. Pat. No. 8,809,770. In the $MS^E$ method, precursor ion scan is performed first, and then the precursor ions in a wide or even the entire mass window are charged into a collision cell for dissociation, and the product ion spectrum is recorded. The precursor ion and the product ion are associated through the deconvolution algorithm by taking advantage of the retention times and the peak profiles of the precursor ion and the product ion in the same analyte in the chromatography (or ion mobility spectrometry) having the same features. The SWATH method is mainly for target analysis, so the precursor ion pre-scan may be omitted. Usually, the precursor ions are directly divided according to the mass, for example, the width of each window is 25 Da. Then each window of precursor ions selected by the quadrupole is entered into a collision cell for dissociation. The product ion spectrum is recorded and compared with the database, and the product ion intensity is used for quantification. In both methods, the precursor ions in a whole range of the mass window are selected and entered into the collision cell for dissociation simultaneously. However, there is a contradiction that if the mass window is too small, the efficiency of the DIA method is reduced, that is, the ion utilization efficiency is too low and it is time consuming to scan the entire mass range. If the mass window is too large, although the ion utilization efficiency is improved, the complexity of the spectrum is increased, and the difficulty in data post-processing (for example, comparison with the database to identify the analyte, or deconvolution to correlate the precursor and product ions) is increased. Therefore, mismatches and misjudgments of the analyte ions occur. Therefore, there is a need for a method to solve the above problems or contradictions.

CITATION LIST

Patent Literature

PTL 1: U.S. Pat. No. 6,717,130
PTL 2: U.S. Pat. No. 8,809,770
PTL 3: U.S. Pat. No. 5,672,870

SUMMARY OF INVENTION

Technical Problem

In view of the above-discussed shortcomings in the prior art, an object of the present invention is to provide a data-independent acquisition method in a mass spectrometer, for solving the above problems in the prior art.

Solution to Problem

To achieve the above and other relevant objects, the present invention provides a data acquisition method in a mass spectrometer, comprising of steps as below: a. providing an ion source to generate precursor ions; b. feeding the precursor ions into a first mass analyzer, wherein the first mass analyzer selects at least one mass window such that the precursor ions located outside the mass window pass through the first mass analyzer and the precursor ions located within the mass window cannot pass through the first mass analyzer; c. feeding the precursor ions passing through the first mass analyzer into a collision cell for collisional dissociation, to generate product ions; d. feeding the product ions into a second mass analyzer for mass analysis and recording a spectrum; and e. repeating Steps b to d, wherein each time when Step b is repeatedly performed, the selected mass window does not overlap with all the mass windows previously selected; and after all the mass windows in a mass range have been selected, the repetition is stopped.

In an embodiment of the present invention, the method further comprises Step f, which is after Step e, wherein the Step f comprises obtaining a spectrum corresponding to the product ions generated by the precursor ions in said selected mass window by a first time data post-processing.

In an embodiment of the present invention, the method further comprises Step g or Step j, which are after Step f. The Step g comprises obtaining a spectrum corresponding to the product ions generated by the precursor ions in said selected mass windows by second mathematical post-processing; and the Step j comprises comparing the spectrum of the product ions with a database, and identifying an analyte.

In an embodiment of the present invention, the method further comprises Step h, which is after Step e, wherein the Step h comprises obtaining a summed spectrum by summing all said recorded spectra.

In an embodiment of the present invention, when Step g is included after Step f, Step i is included after Step h; and when Step j is included after Step f, Step i' is included after Step h. Step i comprises taking the spectrum obtained in Step g as a qualitative result, and the summed spectrum obtained in step h as a quantitative result. Step i' comprises performing quantitative analysis based on the result obtained in Step j in combination with the summed spectrum obtained in Step h.

In an embodiment of the present invention, the method further comprises, after Step a, performing Step k at least once, wherein the Step K comprises allowing all the ions in the mass range pass through the first mass analyzer and enter entering the collision cell for disassociation, and feeding all the disassociated product ions into the second mass analyzer for mass analysis and recording a spectrum.

In an embodiment of the present invention, the mass spectrum obtained in Step k is used as one of the data sources in Step f, to correct the calculation error in Step f.

In an embodiment of the present invention, the spectrum is subjected to noise reduction processing before Step f.

In an embodiment of the present invention, the noise reduction processing comprises removing high-frequency noises by Fast Fourier Transform algorithm.

In an embodiment of the present invention, a step of chromatographic separation of the analyte is included before Step a.

In an embodiment of the present invention, the second time data post-processing in Step g comprises performing deconvolution to correlate the precursor ions and product ions of the same analyte, according to the consistency in chromatographic peak profile or retention time between the precursor ions and product ions.

In an embodiment of the present invention, a precursor ion scan is included before Step b, and said scan is implemented by the second mass analyzer.

In an embodiment of the present invention, the first mass analyzer is a quadrupole mass analyzer, an ion trap mass analyzer, or a time-of-flight mass analyzer.

In an embodiment of the present invention, the second mass analyzer is a time-of-flight mass analyzer or a Fourier transform-type mass analyzer.

In an embodiment of the present invention, a step of separating the precursor ions according to the ion mobility is included before Step b.

In an embodiment of the present invention, the ions in said mass window which do not pass through the first mass analyzer are ejected along a certain direction of the first mass analyzer for the following analysis or detection.

In an embodiment of the present invention, in Step b, a mass window is selected in the first mass analyzer, which comprising at least 5 mass units (Dalton) in a consecutive manner.

In an embodiment of the present invention, in Step b, at least 5 non-continuous mass windows are selected in the first mass analyzer, wherein each window comprising 1 mass unit (Dalton).

In an embodiment of the present invention, the at least 5 non-consecutive mass windows have a pseudo-random distribution.

In an embodiment of the present invention, an inverse Hadamard transform algorism is used in the first time data post-processing.

As described above, the mass spectrum data acquisition method of the present invention can achieve an extremely high ion utilization efficiency, and thus has excellent quantification capability, compared to the prior art. Moreover, the difficulty in data post-processing can be significantly reduced and the probability of mismatches and misjudgments of the mother and product ions of the analyte is lowered. Therefore, the data acquisition method of the present invention has a strong qualification capability.

BRIEF DESCRIPTION OF DRAWINGS

FIG. 1 is a schematic view showing an apparatus in the prior art of the present invention.

FIG. 2 is a schematic view showing an apparatus according to the first embodiment of the present invention.

FIG. 3 is a flow chart showing a method according to the first embodiment of the present invention.

FIG. 4 is a schematic view showing the selection sequence of mass windows according to the first embodiment of the present invention.

FIGS. 5A-5F show mass spectra before and after the first time data post-processing in an embodiment of the present invention.

FIG. 6 is a flow chart showing a method according to the second embodiment of the present invention.

FIG. 7 is a flow chart showing partially a method according to the third embodiment of the present invention.

DESCRIPTION OF EMBODIMENTS

The implementations of the present invention are described below by way of specific embodiments, and other advantages and effects of the present invention are readily comprehensible to those skilled in the art from the disclosure of the present invention. The present invention may be embodied or practiced in various other specific embodiments, the details in the specification may also be based on different perspectives and applications, and various modifications and changes may be made without departing from the spirit and scope of the invention. It should be noted that the following embodiments and the features in the embodiments may be combined with each other without conflict.

It should be noted that the drawings provided in the following embodiments merely schematically illustrate the basic concept of the present invention, and only components related to the present invention are shown in the drawings. Therefore, the drawings are not necessarily drawn according to the number, shape and size of components in practical implementation. The form, number and proportion of each component in practical implementation may be changed at random, and the component layout can be more complicated.

FIG. 1 is a schematic view showing an apparatus used in a currently popular DIA technical solution, for example, the SWATH technique described in U.S. Pat. No. 8,809,770 (not a schematic view showing an acquisition method), in which 1 is an ion source used to generate and transport ions, 2 is a first mass analyzer (for example, a quadrupole) used to select the precursor ions, 3 is a collision cell used to disassociate the precursor ions to generate product ions, and 4 is a second mass analyzer (usually a high-resolution mass analyzer) for analyzing the product ions. The specific analysis process is as follows. Ions 5 in a mass window $M_1$ are selected by a first mass analyzer 2, and other ions 6 located outside the mass window $M_1$ cannot pass through the quadrupole 2 and are discarded. Generally, the width of the mass window $M_1$ is several to several tens of mass units (Da), such as 20 Da, and the precursor ions having a width of 20 Da all enter the collision cell 3 and are disassociated by collision to generate a large number of product ions. All the product ions enter the second mass analyzer 4 for mass analysis to obtain a product ion spectrum. Then, in the first mass analyzer 2, a mass window $M_2$ having the same window width, that is, 20 Da, but not overlapping with the mass range selected previously is selected, followed by collision-induced disassociation and recording of a product ion spectrum. This process is repeated until the preset mass range is completely covered by the selected mass windows. Since the above-described product ion spectrum is one formed by the precursor ions in a range of 20 Da, post-processing of data is required. There are usually two methods available. One is to directly compare with the database to identify and identify the analyte, and the other is to perform mathematical deconvolution processing according to the consistency in chromatographic peak profile or retention time between the precursor ions and product ions of the same analyte, so as to allow the precursor ion to be in correspondence with the product ions, that is, the product ion spectrum corresponding to each precursor ion is obtained.

In the above method, for a typical mass range, such as a m/z from 101 Da to 2100 Da, if a mass window of 20 Da is used, 100 rounds of MS/MS analysis are required, that is, the ion utilization efficiency is 1%. In order to increase the efficiency, a wider mass window, such as 200 Da, can be used. In this case, only 10 rounds of MS/MS analysis are required, and the ion utilization efficiency is 10%. However, the precursor ions in the range of 200 Da all enter the collision cell to dissociate, which will generate a large number of product ions, and the product ion spectrum becomes extremely complicated. It is very difficult to perform data post processing. It may not be possible to determine the product ions according to the database, or a large number of mismatches between the precursor ions and the product ions occur.

Referring to FIGS. 2 to 5F, the present invention provides a data acquisition method in a mass spectrometer, which comprises the following steps:

Step a: Generate precursor ions from an ion source 1'.

Step b: Divide mass windows. As shown in FIG. 4, a total of n windows are divided in a mass range, including $M_1$, $M_2$, ..., $M_i$, ..., $M_{n-1}$, and $M_n$. For example, if the mass range is from 101 Da to 2100 Da, and the width of the mass window is 20 Da, then the 100 mass windows are designated as $M_1$ (101~120 Da), $M_2$ (121~140 Da), $M_3$ (141~160 Da) ... $M_{99}$ (2061~2080 Da), and $M_{100}$ (2081~2100 Da) respectively. Then, a first ion screening is performed by a first mass analyzer 2' as shown in FIG. 2. Unlike the prior art, during the ion filtering in the embodiment, the ions (indicated by the numeral 5' in FIG. 2) in the mass window $M_1$ cannot pass through the first mass analyzer 2', and the ions located outside the mass window $M_1$ (that is, the ions in mass windows $M_2$ to $M_{100}$ with a mass ranging from 121 Da to 2100 Da, indicated by a numeral 6' in FIG. 2) all pass through the first mass analyzer 2'.

Step c: The ions passing through (ions in the mass windows $M_2$ to $M_{100}$) all enter a collision cell 3' as shown in FIG. 2 for collision-induced disassociation, so as to generate a large number of product ions.

Step d: All the product ions enters a second mass analyzer 4' as shown in FIG. 2 for mass analysis and a product ion spectrum is recorded. As shown in FIG. 5A, the product ion spectrum is a complex spectrum with m/z on the horizontal axis and ion signal intensity on the vertical axis. Mathematically, the ion signal intensity at the mass j corresponding to the mass window $M_1$ (denoted as $S_{(1,j)}$) can be considered as super-position of the intensities of the product ions at the mass j generated by the precursor ions in each of the windows $M_2$ to $M_{100}$, and the intensity of product ions at the mass j generated by the precursor ions in a window Mi is denoted as $I_{(i,j)}$, then:

$$S_{(1,j)} = I_{(2,j)} + I_{(3,j)} + \ldots + I_{(99,j)} + I_{(100,j)}$$

Step e: The process from b to d is repeated. However, in this case, the choice in Step b of the window is different from the above, for example, the window $M_2$ is selected. That is, the ions located within the window $M_2$ cannot pass through the mass analyzer 2', and the ions located outside the window $M_2$ all pass through and are dissociated by collision. Then, a product ion spectrum is recorded, as shown in FIG. 5B. The process is repeated, in which $M_3$, $M_4$ ... to $M_{100}$ are selected sequentially, until all the mass windows have been selected, then the step is stopped. FIG. 4 shows the selection sequence of mass windows. It should be noted that the sequence does not have to be in increasing or decreasing order of m/z, and may be in any orders.

Step f: A first time data post-processing is performed. In Steps d and e, 100 product ion spectra are generated (in which the first, second, and n-th spectra are as shown in FIGS. 5A, 5B, and 5C, respectively), and each spectrum results from the superposition of the spectra of the product ions generated by precursor ions in 99 windows. This data post-processing is performed to obtain the spectrum of product ions generated by the precursor ions in an individual window. If the peak pattern of the precursor ions of the analyte is considered to have substantially no change during the acquisition of the 100 product ions spectra, the following relationship exists:

$$S_{(1,j)} = I_{(2,j)} + I_{(3,j)} + \ldots + I_{(99,j)} + I_{(100,j)}$$
$$S_{(2,j)} = I_{(1,j)} + I_{(3,j)} + \ldots + I_{(99,j)} + I_{(100,j)}$$
$$\ldots$$
$$S_{(i,j)} = I_{(1,j)} + I_{(2,j)} + \ldots + I_{(i-1,j)} + I_{(i+1,j)} + \ldots + I_{(99,j)} + I_{(100,j)}$$
$$\ldots$$
$$S_{(99,j)} = I_{(1,j)} + I_{(2,j)} + \ldots + I_{(98,j)} + I_{(100,j)}$$
$$S_{(100,j)} = I_{(1,j)} + I_{(3,j)} + \ldots + I_{(98,j)} + I_{(99,j)}$$

From the above relationship, it can be simply obtained:

$$I_{(i,j)} = \frac{1}{99} \sum_{i=1}^{100} S_{(i,j)} - S_{(i,j)}$$

where i=1, 2 ... 100, and $I_{(i,j)}$ is the intensity of the product ions at mass j generated by the precursor ions in an ith window. In this way, another 100 product ion spectra generated by precursor ions in individual windows are obtained using all of the 100 spectra. The first, second and nth spectra are shown in FIGS. 5D, 5E and 5F, respectively.

Step g: A second time data post-processing is performed. The product ion spectra obtained in Step f are spectra of hybrid product ions generated by collision of precursor ions in a mass range (that is, mass window). Although the mass window is not large (20 Da in the above example), deconvolution is required to obtain a product ion spectrum corresponding to each single precursor ion. Therefore, Step g is consistent with the deconvolution process in most of the DIA methods. The usual processing method comprises performing mathematical deconvolution by utilizing the consistency in chromatographic peak profile or retention time information between the precursor ions and product ions, to correlate the precursor ions and product ions of the same analyte. Common algorithms for deconvolution include Pearson's correlation coefficient, cross correlation score, k-means clustering, entropy minimization method, dot product score, and minimum spanning tree, etc. A variety of algorithms are well known to those skilled in the art, and will not be described here.

Step h: All the product ion spectra obtained in Steps d and e are summed together to obtain a summed spectrum.

Step i: Data analysis is performed by taking the results of Steps g and h together. In this step, the result of Step g is used for qualitative analysis. That is, ions of the analyte are determined according to the mass-to-charge ratio, the isotopic abundance distribution, the fragment distribution, the chromatographic retention time and other information of the high-resolution product ion spectrum, in combination with the information of the standard substance in a preset database (such as the mass-to-charge ratio, retention time, isotopic abundance ratio and other information of the standard substance stored in the database), and then the ions of the analyte are quantified based on the product ion intensity information in the summed spectrum obtained in Step h.

Compared with the prior art (i.e., as described in the background, selectively passing through a mass window to record a product ion spectrum and performing a data post-processing), in the above steps described in the present invention, a method of selectively not passing through a mass window is used, by which the ion utilization efficiency is greatly improved, and the smaller the window is, the higher the ion utilization efficiency will be. For example, the mass window is 20 Da. For a mass range of 2000 Da, remaining ions in a mass range of 1980 Da can pass through. In a cycle, the total ion utilization efficiency is 99%, which is 99 times of the ion utilization efficiency in a method allowing selective passing through. This ion utilization efficiency is reflected by the extremely high product ion intensity in the summed spectrum obtained in Step h. High ion utilization efficiency ensures the excellent quantification capability of this method. Meanwhile, since the present invention tends to select a narrower mass window of preferably 10 to 30 Da, the complexity of the product ion spectrum obtained in Step f is greatly reduced, and the difficulty of deconvolution is greatly reduced in the mathematical deconvolution processing in Step g which is subsequently performed. Of course, the present invention has an additional data post-processing process (Step f) compared to the prior art, but the computational difficulty and computation time consumption of the process are extremely small.

In the above embodiment, the method may further comprise, after Step a, Step k of allowing all the ions in the mass range pass through the first mass analyzer enter the collision cell for disassociation, and feeding all the disassociated product ions into the second mass analyzer for mass analysis and recording a spectrum, where Step k may be repeatedly performed multiple times. The spectrum is actually a spectrum corresponding to product ions generated by all of the precursor ions, which is essentially the same as the summed spectrum obtained in Step h. However, the spectrum can be acquired multiple times within one chromatographic spot and used as one of the data sources in Step f. By this step, the error of calculation in Step f due to the change in the chromatographic peak profile can be corrected.

In the above embodiment, a step of mathematical processing may be included prior to Step f, in which all of the original mass spectra are subjected to noise reduction processing. The reason for performing this step is that in the method, a very high number of ions pass, and noises (mainly consisting of chemical noise, neutral noise, and noise caused by solvent effects, etc.) are also inevitably recorded in the spectrum. In order to obtain a higher signal-to-noise ratio than that of a conventional method, noise reduction processing is needed to be performed first. A very effective noise reduction step is to remove high-frequency noises by Fast Fourier Transform. Here, the high-frequency noises are mainly originated from the influence of solvent molecules and ions in the chromatography (mainly liquid chromatography).

In the above embodiment, a step of chromatographic separation is usually included prior to Step a. Information on the separation of an analyte by chromatography, such as chromatographic peak profile, and retention time, etc., can be used as part of the data source for data post-processing in Step g.

In the above embodiment, a precursor ion scanning process may be included prior to Step b, and the scanning process is implemented by the second mass analyzer. A high-resolution precursor ion spectrum is usually needed to serve as part of the data source for data post-processing in Step g.

In the above embodiment, the first mass analyzer is preferably a quadrupole mass analyzer, and may also be other analyzers, for example, an ion trap mass analyzer, and a time-of-flight mass analyzer. When the quadrupole is used as the first mass analyzer, in order to achieve the passage of ions outside a certain mass window, the ions in the selected window may be excited by means of dipole or quadrupole RF excitation, such that the ions are ejected out along the radial direction (or other direction) of the quadrupole and cannot be passed to the next stage. A similar method is described in U.S. Pat. No. 5,672,870. The second mass analyzer is preferably a high-resolution mass analyzer such as a time-of-flight mass analyzer, a Fourier transform-type mass analyzer, and the like.

In the above embodiment, ions in the mass window that are not passed through the first mass analyzer, for example, ions selectively excited by a quadrupole or an ion trap, and ejected out in the radial direction may be detected by a detector, or left for later analysis.

In the above embodiment, a step of separating the precursor ions according to the ion mobility may be included prior to Step b. Information on the separation of an analyte according to the ion mobility, such as ion mobility peak pattern and drift time, etc., can be used as part of the data source for data post-processing in Step g.

FIG. 6 shows a second embodiment of the present invention. In this embodiment, Step g is omitted, and Step j is performed in which data analysis is directly performed on the product ion spectrum obtained in Step f. This step is similar to the data processing step in the SWATH method, and mainly corresponding to the target analysis. That is, the product ion spectrum and chromatographic information are compared with those in the database and analyzed to identify the analyte, and then quantitative analysis is performed with reference to the summed spectrum obtained in Step h, as shown in Step i' of FIG. 6.

FIG. 7 shows a third embodiment according to the present invention. In Step b' in this embodiment, instead of selecting a single mass window, multiple mass windows (e.g. 5) are selected. The mass windows are preferably non-continuous, and each mass window only contains a unit mass (1 Dalton). Further, the mass windows have a pseudo-random distribution. The ions located outside the plurality of selected mass windows are passed through the first mass analyzer. At this time, the data post-processing in Step f is an inverse Hadamard transform. Such an algorism with different purposes has been widely used in time-of-flight mass spectrometry, and ion mobility spectroscopy, etc., and are well known to those skilled in the art, and thus will not be described herein. The advantage of this embodiment is that information of all product ion spectra, rather than only one spectrum, is utilized in the transformation process, so the signal-to-noise ratio of the transformed data is greatly improved. In this embodiment, the first mass analyzer is preferably an ion trap mass analyzer. By using the mass analyzer, the ejection of ions of any mass selected can be easily achieved, so as to avoid the feeding of the ions into the next collision cell. The first mass analyzer may also be a quadrupole mass analyzer.

Although for a quadrupole mass analyzer, it is generally considered difficult to achieve the ejection of ions within the mass window of 1 Dalton due to the fact that the ions pass through quickly, i.e., only a low RF oscillation period is experienced, there are currently techniques that are shown to be able to achieve this purpose by applying a special high-frequency electric field. Therefore, there is no limitation on the quadrupole mass analyzer in this embodiment.

In summary, the MS data acquisition method of the present invention improves the ion utilization efficiency of the data-independent acquisition method, reduces the difficulty in data post-processing, and effectively overcomes various shortcomings in the prior art, thus having high industrial application value.

The above embodiments are merely illustrative of the principles and advantages of the present invention, and not intended to limit the present invention. Modifications or variations can be made to the above embodiments by those skilled in the art without departing from the spirit and scope of the present invention. Therefore, all equivalent modifications or changes made by those skilled in the art without departing from the spirit and scope of the present invention are covered by the appended claims of the present invention.

The invention claimed is:

1. A data acquisition method in a mass spectrometer, comprising:
   a. providing an ion source to generate precursor ions;
   b. feeding the precursor ions into a first mass analyzer, wherein the first mass analyzer selects at least one mass window such that the precursor ions located outside the mass window pass through the first mass analyzer and the precursor ions located within the mass window cannot pass through the first mass analyzer;
   c. feeding the precursor ions passing through the first mass analyzer into a collision cell for collisional dissociation, to generate product ions;
   d. feeding the product ions into a second mass analyzer for mass analysis and recording a spectrum; and
   e. repeating Steps b to d, wherein each time when Step b is repeatedly performed, the selected mass window does not overlap with all the mass windows previously selected; and after all the mass windows in a mass range have been selected, the repetition is stopped.

2. The data acquisition method according to claim 1, comprising Step f, which is after Step e, wherein
   the Step f comprises obtaining a spectrum corresponding to the product ions generated by the precursor ions in said selected mass window by a first time data post-processing.

3. The data acquisition method according to claim 2, comprising Step g or Step j, which are after Step f, wherein
   the Step g comprises obtaining a spectrum corresponding to the product ions generated by the precursor ions in said selected mass windows by second mathematical post-processing; and
   the Step j comprises comparing the spectrum of the product ions with a database, and identifying an analyte.

4. The data acquisition method according to claim 3, comprising Step h, which is after Step e, wherein
   the Step h comprises obtaining a summed spectrum by summing all said recorded spectra.

5. The data acquisition method according to claim 4, wherein when Step g is comprised after Step f, Step i is included after Step h; and when Step j is included after Step f, Step i' is included after Step h, wherein
   the Step i comprises taking said spectrum obtained in Step g as a qualitative result, and said summed spectrum obtained in Step h as a quantitative result; and
   the Step i' comprises performing a quantitative analysis based on the result obtained in Step j in combination with said summed spectrum obtained in Step h.

6. The data acquisition method according to claim 5, comprising, after Step a, performing Step k at least once, wherein
   the Step k comprises allowing all the ions in said mass range pass through the first mass analyzer and enter the collision cell for disassociation, and feeding all the disassociated product ions into the second mass analyzer for mass analysis and recording a spectrum.

7. The data acquisition method according to claim 6, wherein said mass spectrum obtained in Step k is used as one of the data sources in Step f, to correct a calculation error in Step f.

8. The data acquisition method according to claim 3, comprising a step of chromatographic separation for the analyte before Step a.

9. The data acquisition method according to claim 8, wherein the second time data post-processing in Step g comprises performing deconvolution to correlate the precursor ions and product ions of the same analyte, according to the consistency in chromatographic peak profile or retention time between the precursor ions and product ions.

10. The data acquisition method according to claim 2, wherein the spectrum is subjected to noise reduction processing before Step f.

11. The data acquisition method according to claim 10, wherein the noise reduction processing comprises removing high-frequency noises by Fast Fourier Transform algorithm.

12. The data acquisition method according to claim 2, wherein in Step f, an inverse Hadamard transform algorism is used in the first time data post-processing.

13. The data acquisition method according to claim 1, comprising a precursor ion scan before Step b, and said scan is implemented by the second mass analyzer.

14. The data acquisition method according to claim 1, wherein the first mass analyzer is a quadrupole mass analyzer, an ion trap mass analyzer, or a time-of-flight mass analyzer.

15. The data acquisition method according to claim 1, wherein the second mass analyzer is a time-of-flight mass analyzer or a Fourier transform-type mass analyzer.

16. The data acquisition method according to claim 1, comprising a step of separating the precursor ions according to the ion mobility before Step b.

17. The data acquisition method according to claim 1, wherein the ions in said mass window which do not pass through the first mass analyzer are ejected along a certain direction of the first mass analyzer for the following analysis or detection.

18. The data acquisition method according to claim 1, wherein in Step b, a mass window is selected in the first mass analyzer, which comprising at least 5 mass units (Dalton) in a consecutive manner.

19. The data acquisition method according to claim 1, wherein in Step b, at least 5 non-continuous mass windows are selected in the first mass analyzer, wherein each window comprising 1 mass unit (Dalton).

20. The data acquisition method according to claim 19, wherein said at least 5 non-continuous mass windows have a pseudo-random distribution.

* * * * *